United States Patent [19]
Chi

[11] Patent Number: 5,303,611
[45] Date of Patent: Apr. 19, 1994

[54] UPPER STEERING ASSEMBLY

[76] Inventor: Yi-Chen Chi, No. 139-5, An Mei Rd., Mei Shan Village, Hou Li Hsiang, Taichung Hsien, Taiwan

[21] Appl. No.: 116,140

[22] Filed: Sep. 2, 1993

[51] Int. Cl.5 .................. B62K 21/12; F16C 11/06
[52] U.S. Cl. .................. 74/551.1; 280/279; 280/280; 384/540; 403/90; 403/88
[58] Field of Search ............. 74/551.1–551.8; 280/279, 280; 384/540; 403/90, 88, 315, 320

[56]  References Cited
U.S. PATENT DOCUMENTS

| | | | |
|---|---|---|---|
| 555,150 | 2/1896 | Dieterich et al. | 74/551.1 |
| 627,187 | 6/1899 | Hall | 74/551.1 |
| 2,500,909 | 3/1950 | Winby | 285/86 |
| 3,304,099 | 2/1967 | Jankowski | 280/287 |
| 3,438,650 | 4/1969 | Jaulmes | 280/279 |
| 3,902,816 | 9/1975 | Moore | 403/114 |
| 4,068,961 | 1/1978 | Ebner et al. | 403/55 |
| 4,274,301 | 6/1981 | Katayama | 74/551.1 |
| 4,323,263 | 4/1982 | Cook et al. | 74/551.1 |
| 4,341,394 | 7/1982 | Cabeza | 280/279 |
| 4,410,197 | 10/1983 | St. Hillaire | 280/279 |
| 4,545,594 | 10/1985 | Cabeza | 280/279 |
| 4,545,691 | 10/1985 | Kastan et al. | 384/458 |
| 4,635,768 | 3/1987 | Keys et al. | 280/279 |
| 4,708,574 | 11/1987 | Conboy et al. | 414/591 |
| 4,722,502 | 2/1988 | Mueller et al. | 248/284 |
| 4,770,435 | 9/1988 | Cristie | 280/279 |
| 4,890,947 | 1/1990 | Williams et al. | 403/16 |
| 4,915,535 | 4/1990 | Willetts et al. | 403/191 |
| 5,080,519 | 1/1992 | Chi | 74/551.1 |
| 5,085,063 | 2/1992 | Van Dyke et al. | 280/279 X |
| 5,095,770 | 3/1992 | Rader | 74/551.3 |
| 5,163,758 | 11/1992 | Chi | 384/540 |
| 5,178,035 | 1/1993 | D'Aluisio | 280/280 X |
| 5,197,349 | 3/1993 | Herman | 74/551.1 |
| 5,201,242 | 4/1993 | Chi | 74/551.1 |
| 5,201,244 | 4/1993 | Stewart et al. | 74/551.3 |
| 5,251,995 | 10/1993 | Chi | 280/279 X |

Primary Examiner—Vinh T. Luong
Attorney, Agent, or Firm—Woodcock Washburn Kurtz Mackiewicz & Norris

[57] ABSTRACT

An upper steering assembly for a bicycle includes a head tube, a steerer tube passing through the head tube, a bearing assembly mounted on a top of the head tube and around the steerer tube, a rotational socket having a threaded inner periphery and including an upper clamping portion and a lower skirt portion which has an annular groove in an underside thereof for retaining the bearing assembly, and a compression socket mounted around the steerer tube and having a longitudinal slit and including an upper clamping section and a lower tubular section which is in threading connection with the inner periphery of the rotational socket allowing an adjustment of vertical position of the rotational socket relative to the compression socket.

5 Claims, 3 Drawing Sheets

UPPER STEERING ASSEMBLY

BACKGROUND OF THE INVENTION

1. Field of the Invention

The present invention relates to an upper steering assembly for a bicycle.

2. Description of Related Art

U.S. Pat. No. 5,095,770 to Rader, III discloses a steering bearing assembly for a wheeled vehicle which includes a force means for exerting a radial force between the smooth outer surface of the steerer tube and the second race to push the second race toward the first race and to fix the second race on the steerer tube. Such a structure still, however, tends to be worn and thus loosened when on a rugged road as being subjected to up and down shock.

The present invention provides an improved upper steering assembly to mitigate and/or obviate the above-mentioned drawbacks.

SUMMARY OF THE INVENTION

An upper steering assembly for a bicycle provided by the present invention includes a head tube, a steerer tube passing through the head tube, a bearing assembly mounted on a top of the head tube and around the steerer tube, a rotational socket, and a compression socket.

The rotational socket has a threaded inner periphery and includes an upper clamping portion and a lower skirt portion which has an annular groove in an underside thereof for retaining the bearing assembly.

The compression socket is mounted around the steerer tube and has a slit which is formed in a periphery thereof and extends along a longitudinal direction thereof. The compression socket includes an upper clamping section and a lower tubular section which is in threading connection with the inner periphery of the rotational socket, allowing an adjustment of vertical position of the rotational socket relative to the compression socket. A bolt may be provided on the upper clamping section for adjusting a width of the longitudinal slit for releasably retaining the steerer tube. Furthermore, the clamping portion of the rotational socket includes a second longitudinal slit in a periphery thereof and comprises a bolt for adjusting a width of the second longitudinal slit, assuring that the steerer tube is securely retained.

The bearing assembly comprises a lower race mounted on an upper end of the head tube, an upper race above the lower race, and a plurality of ball bearings between the lower and upper races, the upper race has an inner surface which tapers downwardly and the annular groove of the skirt portion of the rotational socket includes a corresponding outward facing surface which tapers downwardly.

Preferably, the steerer tube has a longitudinal groove in an upper section thereof and the compression socket includes a stop projecting radially and inwardly and being received in the longitudinal groove, preventing relative rotational movement therebetween.

Preferably, the clamping section of the compression socket includes a pair of vertical walls for fingers' grasping or placement of wrench jaws, whereby the user may easily rotate the rotational socket to adjust the tightness of the ball bearings.

Other objects, advantages, and novel features of the invention will become more apparent from the following detailed description when taken in conjunction with the accompanying drawings.

DESCRIPTION OF THE PREFERRED EMBODIMENT

Figure 1:
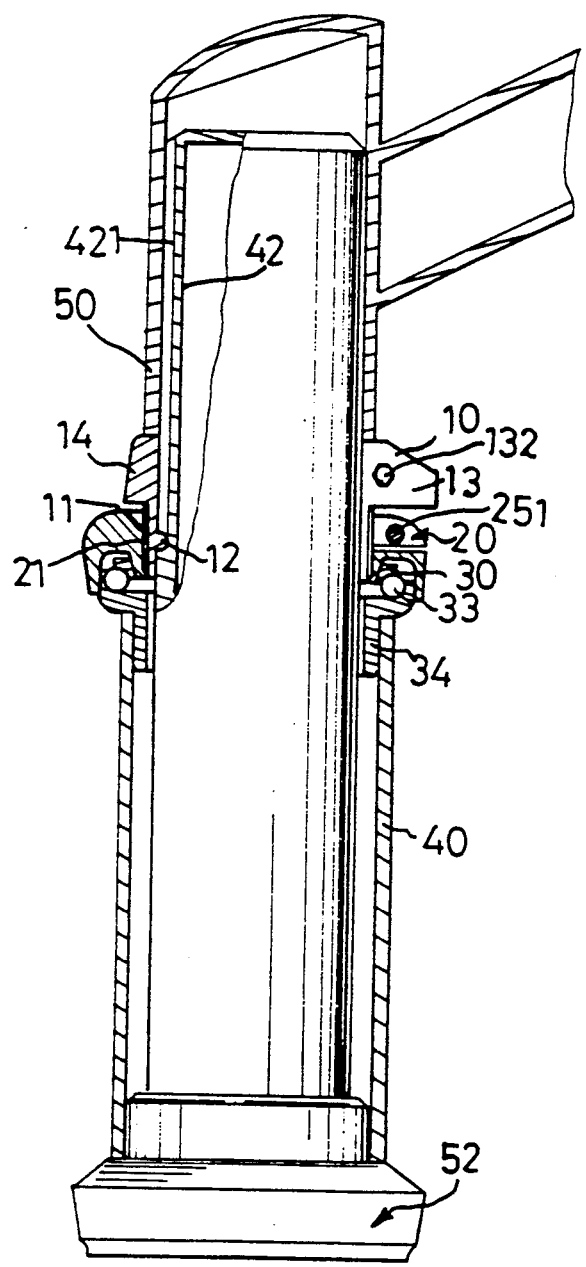
FIG. 1 is a cross-sectional view of a bicycle steering assembly in accordance with the present invention.
Figure 2:
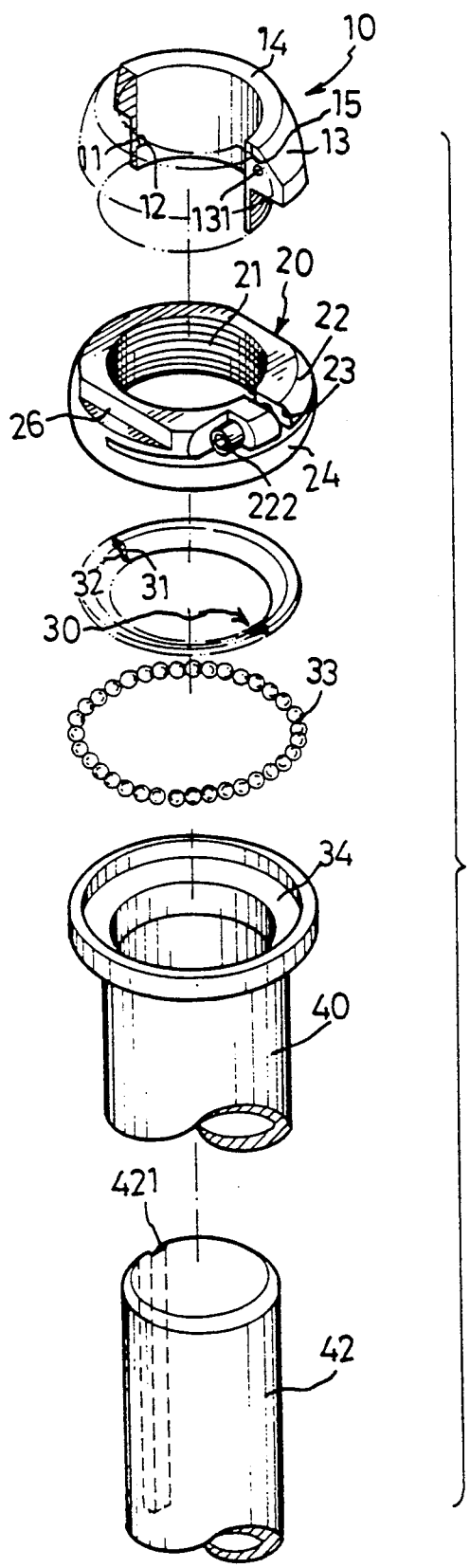
FIG. 2 is an exploded view of the upper bearing assembly in accordance with the present invention.
Figure 3:
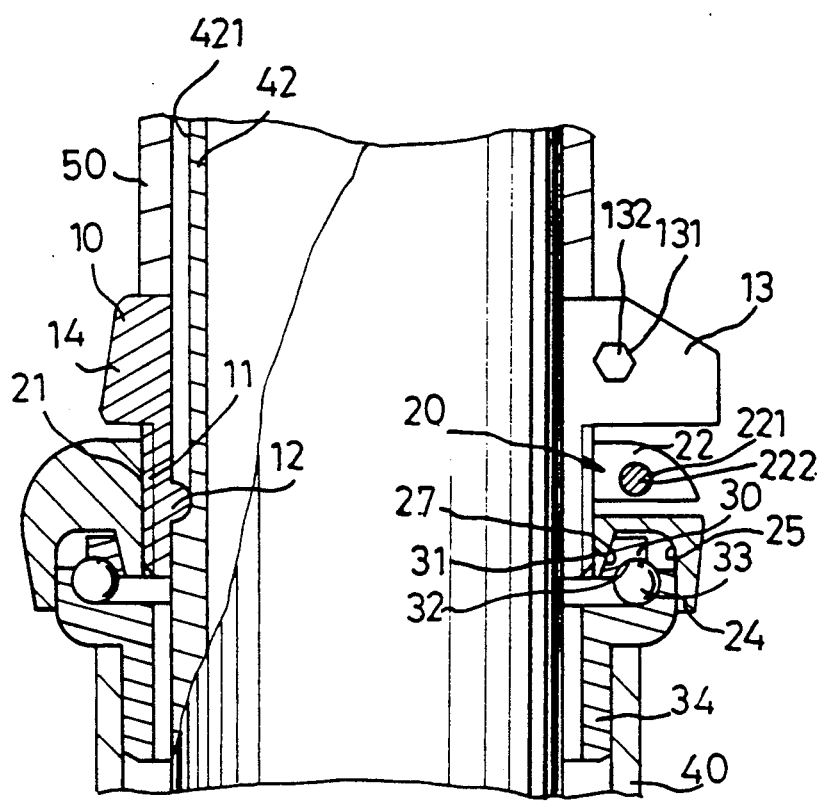
FIG. 3 is a partial cross-sectional view, at an enlarged scale, showing the upper steering assembly in accordance with the present invention.

Referring to FIGS. 1 through 3, the upper steering assembly in accordance with the present invention generally includes a steerer tube 42 which has a longitudinal groove 421 in an upper section thereof, a head tube 40, a bearing means, a compression socket 10, and a rotational socket 20. The bearing means includes a lower race 34 mounted on an upper end of the head tube 40, an upper race 30 above the lower race 34, and ball bearings 33 between the lower and upper races 34 and 30. The upper race 30 is substantially a ring and includes an annular downwardly facing concave surface 32 for engaging with the ball bearings 33 and an inner peripheral surface 31 which tapers downward whose function will be explained later.

The rotational socket 20 is threaded in an inner periphery 21 thereof and includes an upper clamping portion 22 which has a longitudinal slit 23 and a lower skirt portion 24 which has an annular groove 25 in an underside thereof. The width of the slit 23 in the upper clamping portion 22 can be varied by operating a bolt 222 which passes through a hole 221 in the clamping portion 22. The clamping portion 22 of the rotational socket 20 includes vertical walls 26 for fingers' grasping or placement of wrench jaws.

The compression socket 10 also has a longitudinal slit 15 and includes an upper clamping section 14 and a lower tubular section 11 which has a threaded outer periphery for engaging with the inner periphery 21 of the rotational socket 20. The compression socket 10 includes a stop 12 projecting radially and inwardly from an inner periphery thereof and being received in the longitudinal groove 421. The upper clamping section 14 includes a pair of lugs 13 between which the slit 15 is formed. Aligned holes 131 are formed in the lugs 13, and a bolt 132 may be inserted into the holes 131 to adjust the width of the slit 15, allowing adjustment of the compression socket 10.

In assembly, as shown in FIG. 1, the head tube 40 is mounted around the steerer tube 42, and the bearing assembly is mounted on top of the head tube 40. The lower tubular section 11 of the compression socket 10 is received in the rotational socket 20. The assembled compression socket 10 and rotational socket 20 are mounted around the steerer tube 42 in a manner shown in FIGS. 1, 3 in which the stop 12 is received in the longitudinal groove 421 to prevent relative rotational movement therebetween, while the annular groove 25 receives the bearing assembly. The annular groove 25 of the skirt portion 24 of the rotational socket 20 includes an outwardly facing surface 27 which tapers downwardly to cooperate with the downwardly tapering inner surface 31 of the upper race 30, thereby securely retaining the bearing assembly. As can be seen in FIG. 1, a handle bar stem 50 encloses the upper section of the steerer tube 42 whose lower end is equipped with a lower bearing assembly 52.

The steerer tube 42, when in an appropriate position, is securely clamped by the compression socket 10 under rotation of bolt 132 to narrow the width of slit 15. The user may narrow the width of slit 23 in the rotational socket 20 to assure that the steerer tube 42 is securely retained. Furthermore, the user may rotate the rotational socket 20 by his fingers -grasping the vertical walls 26 to adjust the vertical position of the rotational socket 20, which, in turn, changes the downward force acting on the ball bearings 33, thereby adjusting the tightness of the ball bearings 33. An advantage of the present design is that the whole bearing assembly is shielded in the rotational socket 20, which means that no sealing member is required in preventing dust, dirty oil, and the like from entering the bearing assembly.

Although the invention has been explained in relation to its preferred embodiment, it is to be understood that many other possible modifications and variations can be made without departing from the spirit and scope of the invention as hereinafter claimed.

I claim:

1. An upper steering assembly for a bicycle comprising:
   a head tube;
   a steerer tube passing through the head tube;
   a bearing assembly mounted on a top of the head tube and around the steerer tube;
   a rotational socket having a threaded inner periphery and including an upper clamping portion and a lower skirt portion which has an annular groove in an underside thereof for retaining the bearing assembly;
   a compression socket mounted around the steerer tube and having a longitudinal slit, the compression socket including an upper clamping section and a lower tubular section which has a threaded outer periphery for engaging with the inner periphery of the rotational socket, allowing an adjustment of vertical position of the rotational socket relative to the compression socket, and means on the upper clamping section for adjusting a width of the longitudinal slit for releasably retaining the steerer tube.

2. The upper steering assembly as claimed in claim 1 wherein the bearing assembly comprises a lower race mounted on an upper end of the head tube, an upper race above the lower race, and a plurality of ball bearings between the lower and upper races, the upper race has an inner peripheral surface which tapers downwardly and the annular groove of the skirt portion of the rotational socket includes a corresponding outward facing surface which tapers downwardly.

3. The upper steering assembly as claimed in claim 1 wherein the steerer tube has a longitudinal groove in an upper section thereof and the compression socket includes a stop projecting radially and inwardly and being received in the longitudinal groove.

4. The upper steering assembly as claimed in claim 1 wherein the clamping section of the compression socket includes a pair of vertical walls.

5. The upper steering assembly as claimed in claim 1 wherein the clamping portion of the rotational socket includes a longitudinal slit in a periphery thereof and comprising a means for adjusting a width of the longitudinal slit.

* * * * *